US012759297B2

(12) United States Patent
Osaki et al.

(10) Patent No.: US 12,759,297 B2
(45) Date of Patent: Oct. 13, 2026

(54) LIQUID EJECTION HEAD

(71) Applicant: CANON KABUSHIKI KAISHA, Tokyo (JP)

(72) Inventors: Yasuhiko Osaki, Kanagawa (JP); Satoshi Kimura, Kanagawa (JP); Shuzo Iwanaga, Kanagawa (JP); Shingo Okushima, Kanagawa (JP); Hiromasa Amma, Kanagawa (JP); Seiji Suzuki, Kanagawa (JP); Takaya Sato, Tokyo (JP); Ran Kudo, Tokyo (JP); Ryosuke Araki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 18/526,268

(22) Filed: Dec. 1, 2023

(65) Prior Publication Data

US 2024/0181777 A1 Jun. 6, 2024

(30) Foreign Application Priority Data

Dec. 2, 2022 (JP) ................................ 2022-193612
Sep. 25, 2023 (JP) ................................ 2023-160139

(51) Int. Cl.

*B41J 2/155* (2006.01)
*B41J 2/175* (2006.01)
*B41J 25/308* (2006.01)

(52) U.S. Cl.

CPC ............... *B41J 2/155* (2013.01); *B41J 2/175* (2013.01); *B41J 25/308* (2013.01)

(58) Field of Classification Search

CPC ... B41J 2/155; B41J 2/175; B41J 29/02; B41J 25/34; B41J 25/308

(Continued)

(56) References Cited

U.S. PATENT DOCUMENTS 7,401,899 B2 7/2008 Nellen
2013/0100207 A1* 4/2013 Van Der Zwan ...... B41J 25/308 347/37

(Continued)

FOREIGN PATENT DOCUMENTS

EP 4 303 016 A1 1/2024
JP 4942999 B2 5/2012

(Continued)

OTHER PUBLICATIONS

Extended European Search Report dated Apr. 12, 2024, in European Application No. 23208180.2.

(Continued)

*Primary Examiner* — Stephen D Meier
*Assistant Examiner* — Thomas Ray Knief
(74) *Attorney, Agent, or Firm* — Venable LLP

(57) ABSTRACT

A liquid ejection head, including a recording element substrate configured with a liquid ejection port, further includes a first positioning member configured with a first positioning part including a recess portion opening in a direction of liquid ejection; and a second positioning member configured with a second positioning part, which includes a groove portion opening in the direction of liquid ejection and extending towards the first positioning member, and a third positioning part, which includes a flat plane portion substantially parallel to the recording element substrate.

9 Claims, 10 Drawing Sheets

(58) Field of Classification Search
USPC .......................................................... 347/42
See application file for complete search history.

(56) References Cited

U.S. PATENT DOCUMENTS

| | | | | |
|---|---|---|---|---|
| 2013/0128254 | A1 | 5/2013 | Badami | |
| 2021/0206168 | A1 * | 7/2021 | Raymond | B41J 2/16511 |

FOREIGN PATENT DOCUMENTS

| | | | | |
|---|---|---|---|---|
| WO | WO-2016102000 | A1 * | 6/2016 | B41J 2/16585 |
| WO | 2020/051056 | A1 | 3/2020 | |

OTHER PUBLICATIONS

Office Action dated Apr. 21, 2026, in Korean Patent Application No. 10-2023-0165788.

* cited by examiner

LIQUID EJECTION HEAD

BACKGROUND OF THE INVENTION

Field of the Invention

The present disclosure relates to a liquid ejection head capable of ejecting liquid in a pressure chamber from an ejection port using a recording element.

Description of the Related Art

In recent years, liquid ejection apparatuses such as inkjet recording apparatuses have been used not only for home printing, but also for commercial purposes such as for business and retail photos, or have also been used for industrial purposes such as for electronic circuit drawings or panel displays, and the applications of such liquid ejection apparatuses are continuing to expand. For the liquid ejection heads of such liquid ejection apparatuses in commercial printing, high-speed printing and continuous printing operation are required.

Further, liquid ejection heads may be configured to be detachably attachable to a liquid ejection apparatus in order to be replaceable (see Japanese Patent No. 4942999 (hereinafter referred to as Document 1), etc.). In that case, it is required that the replacement work be simple at the time of replacing a liquid ejection head.

On the other hand, liquid ejection heads generally have multiple nozzles and ejection ports, and also must be positioned in the liquid ejection apparatus with extremely high accuracy in order to maintain high print quality. The demand for accuracy in positioning the liquid ejection heads is increasing as the printing resolution of liquid ejection apparatuses increases. Further, in order to configure a large liquid ejection head, an inkjet head has been proposed in which a large number of small ejection modules are arranged side by side on a base member to ensure a large print area.

In a case where a liquid ejection head is configured to be detachably attachable to a liquid ejection apparatus, if the position of the liquid ejection head is displaced due to attaching/detaching, there arises a problem where print quality is deteriorated. Further, in a liquid ejection head in which a large print area (a liquid ejection area) is configured by arranging a large number of ejection modules side by side on a base member, misalignment can easily occur as the ejection modules are mounted on the base member. Therefore, in a case where multiple liquid ejection heads are mounted, the ejection port positions of the respective liquid ejection heads become scattered, and thus, a mechanism for adjusting the mounting positions of the liquid ejection heads becomes necessary. Further, there are problems such as the need to make the misalignment less noticeable through image processing such as gradation, ejection timing, or an adjustment such as shifting the ejection ports used. A purpose of the present disclosure is to offer a configuration that can achieve highly accurate positioning of an ejection port at a predetermined position as a liquid ejection head is mounted on a liquid ejection apparatus.

SUMMARY OF THE INVENTION

The present disclosure is intended to solve the above-described problem, and provides techniques related to the liquid ejection head configuration described below. The head configuration corresponds to a liquid ejection head including a recording element substrate configured with a liquid ejection port, the liquid ejection head including: a first positioning member configured with a first positioning part including a recess portion opening in a direction of liquid ejection; and a second positioning member configured with a second positioning part, which includes a groove portion opening in the direction of liquid ejection and extending towards the first positioning member, and a third positioning part, which includes a flat plane portion substantially parallel to the recording element substrate.

Further, as another configuration, the head configuration corresponds to a full-line type equipped with a plurality of recording element substrates configured with liquid ejection ports, the liquid ejection head including: a support member configured to extend in a longitudinal direction of the liquid ejection head to support the plurality of recording element substrates; and a positioning member equipped on the support member.

Further features of the present invention will become apparent from the following description of exemplary embodiments with reference to the attached drawings.

DESCRIPTION OF THE EMBODIMENTS

Hereinafter, an example of embodiments of the present disclosure is explained with reference to the drawings.

However, the following description is not intended to limit the range of the present disclosure. As an example, the present embodiment employs a thermal method in which liquid is ejected by generating air bubbles with a heat generation element. However, liquid ejection heads employing a piezoelectric method and other various kinds of liquid ejecting methods can also be applied to the present disclosure.

In addition, in the present disclosure, the X-axis, Y-axis, and Z-axis are used as appropriate as directional axes for explaining the configuration of the liquid ejection head 3, etc. The X-axis and Y-axis are perpendicular to each other in the horizontal plane and constitute the liquid ejection surface. The long axis of the liquid ejection head extends in the Y-axis direction, and the recording medium 2 moves in the X-axis direction. The Z-axis is a vertical axis perpendicular to the X-axis and the Y-axis, and parallel to the liquid ejection direction as described below.

First Embodiment (Liquid Ejection Apparatus)

Although the present embodiment is an inkjet recording apparatus (a recording apparatus) with a form in which liquid such as ink is circulated between a tank and a liquid ejection head, there may be other forms. For example, there may be a form in which two tanks are installed on the upstream side and the downstream side of a liquid ejection head without circulating ink, and the ink in a pressure chamber is made to flow by flowing the ink from one tank to the other tank.

The apparatus that ejects liquid according to the present disclosure, particularly the inkjet recording apparatus 1000 (hereinafter also referred to as a recording apparatus) which performs recording by ejecting ink, is equipped with the conveyance part 1 for conveying the recording medium 2 and the line type liquid ejection head 3 arranged substantially perpendicular to the conveyance direction of the recording medium 2, and is a line type recording apparatus for performing continuous recording in one pass while continuously or intermittently conveying multiple recording media 2. The recording medium 2 is not limited to a cut type, and may be a continuous roll type. For example, paper or cloth can be used as the recording medium 2.

The liquid ejection head 3 is capable of full-color printing using CMYK inks (cyan, magenta, yellow, and black). As described below, a liquid supply unit, which is a supply path for supplying liquid to the liquid ejection head, a main tank, and a buffer tank (see FIG. 1) are fluidly connected to the liquid ejection head 3. Further, an electric control unit for transmitting electric power and ejection control signals to the liquid ejection head 3 is electrically connected to the liquid ejection head 3. The liquid path and electric signal path in the liquid ejection head 3 are described below.

Figure 1:
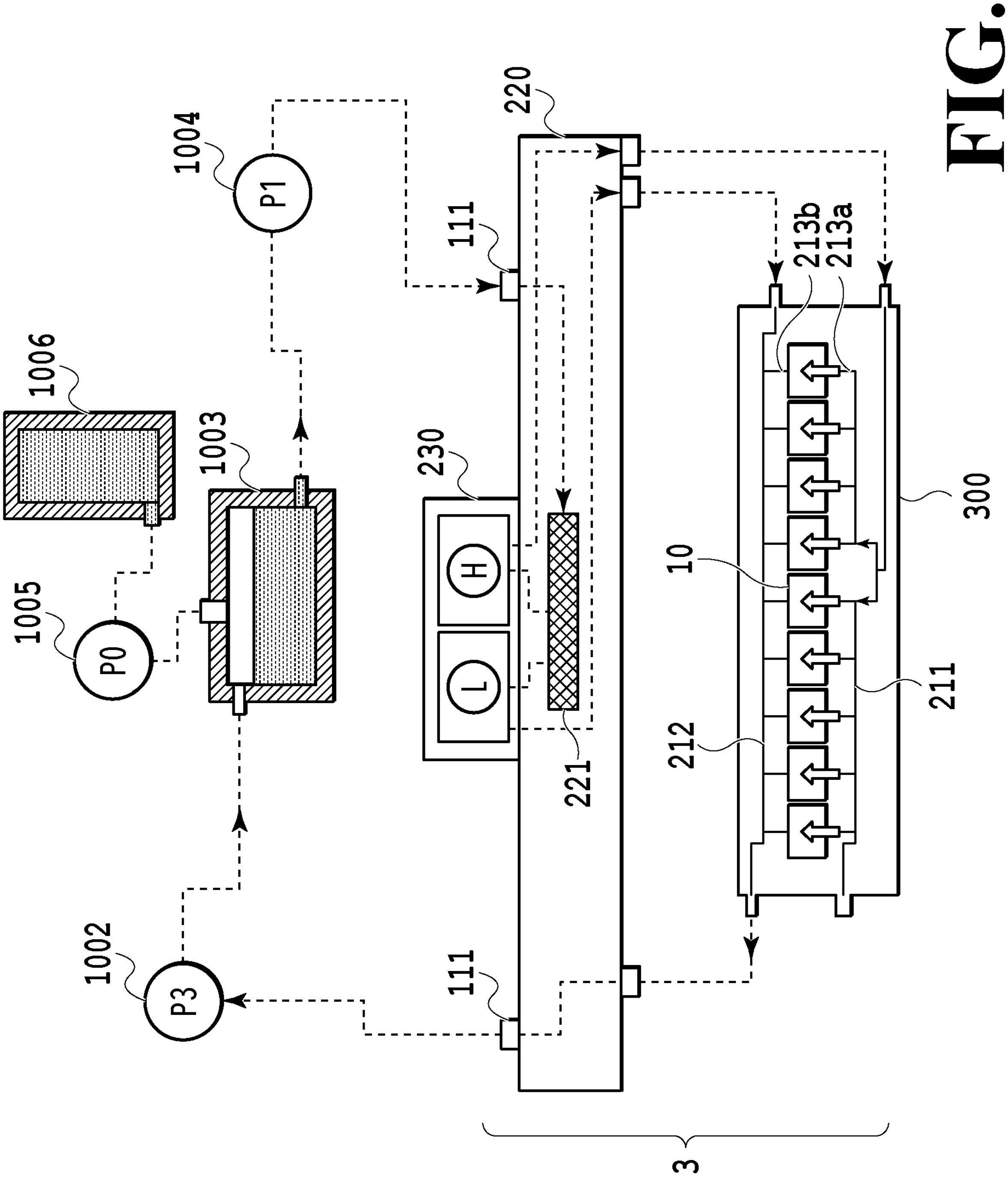
FIG. 1 is a schematic view illustrating an example of the circulation path applied to the liquid ejection apparatus of the present disclosure.

FIG. 1 is a schematic diagram illustrating the circulation path applied in the recording apparatus of the present embodiment, and is a diagram in which the liquid ejection head 3 is fluidly connected to the first circulating pump 1002, the buffer tank 1003, etc. Note that, although only the path through which one color of CMYK ink flows is illustrated in FIG. 1 to simplify the description, the circulation paths for four colors are actually installed in the liquid ejection head 3 and the main body of the recording apparatus. The buffer tank 1003, which is a sub tank connected to the main tank 1006, has an air communication port (not illustrated in the drawings) that makes the inside and the outside of the tank communicate with each other, and it is possible to discharge air bubbles in the ink to the outside. The buffer tank 1003 is also connected to the replenishing pump 1005. If the liquid is consumed by the liquid ejection head 3 for ejecting (discharging) ink from the ejection ports of the liquid ejection head, such as recording and suction recovery performed by ejecting ink, the replenishing pump 1005 transfers the consumed amount of ink from the main tank 1006 to the buffer tank 1003.

The first circulating pump 1002 has a role of drawing liquid from the liquid connection part 111 of the liquid ejection head 3 and flowing the liquid to the buffer tank 1003. At the time the liquid ejection head 3 is driven, a fixed amount of ink is flowed into the common collecting flow path 212 by the first circulating pump 1002.

The negative pressure control unit 230 is installed between the paths of the second circulating pump 1004 and the liquid ejection unit 300. The negative pressure control unit 230 has a function of operating so that, even in a case where the flow rate of the circulation system fluctuates due to a difference in print density for performing recording, the pressure of the downstream side of the negative pressure control unit 230 (that is, on the liquid ejection unit 300 side) is maintained at a fixed pressure set in advance.

As illustrated in FIG. 1, the negative pressure control unit 230 is equipped with two pressure adjustment mechanisms, each of which is set to a mutually different control pressure. Of the two negative pressure adjustment mechanisms, each of the relatively high pressure setting side (indicated by H in FIG. 1) and the relatively low pressure side (indicated by L in FIG. 1) passes through the liquid supply unit 220 and is connected to the common supply flow path (the common inflow path) 211 or the common collecting flow path (the common outflow path) 212 in the liquid ejection unit 300. The common supply flow path 211, the common collecting flow path 212, and the individual supply flow paths 213*a* and the individual collecting flow paths 213*b* that communicate with each recording element substrate 10 are installed in the liquid ejection unit 300. Since the individual flow paths 213*a*, 213*b* communicate with the common supply flow path 211 and the common collecting flow path 212, some of the liquid flowed by the first circulating pump 1002 passes from the common supply flow path 211 through the internal flow path of the recording element substrates 10 to the common collecting flow path 212 (the arrows in FIG. 1). This is because a pressure difference is set between the pressure adjustment mechanism H connected to the common supply flow path 211 and the pressure adjustment mechanism L connected to the common collecting flow path 212, and the first circulating pump 1002 is only connected to the common collecting flow path 212.

In this manner, a liquid flow that passes through the common collecting flow path 212 and a liquid flow that passes from the common supply flow path 211 through each recording element substrate 10 to the common collecting flow path 212 occur in the liquid ejection unit 300. Therefore, the heat generated in each recording element substrate 10 can be discharged to the outside of the recording element substrates 10 via the flow from the common supply flow path 211 to the common collecting flow path 212. Further, with a configuration as such, as recording is being performed by the liquid ejection head 3, it is possible to cause a flow of ink even in an ejection port or a pressure chamber in which recording is not being performed, and thus, thickening of the ink at those sections can be suppressed. Moreover, thickened ink and foreign substances in the ink can be discharged to the common collecting flow path 212. Therefore, high-speed and high-quality recording is possible with the liquid ejection head 3 of the present embodiment.

Figure 2C:
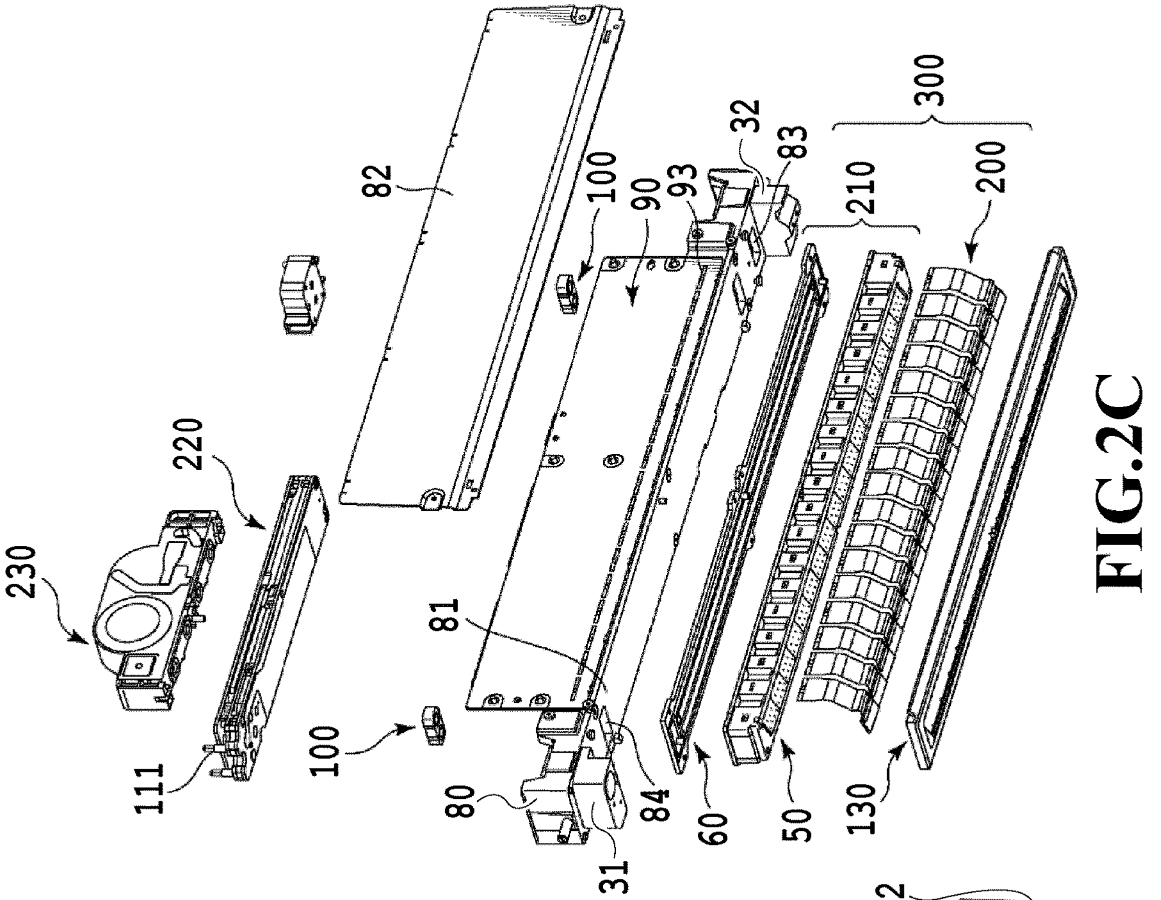
FIG. 2C is an exploded perspective view seen from the recording element substrate side.
Figure 2A:
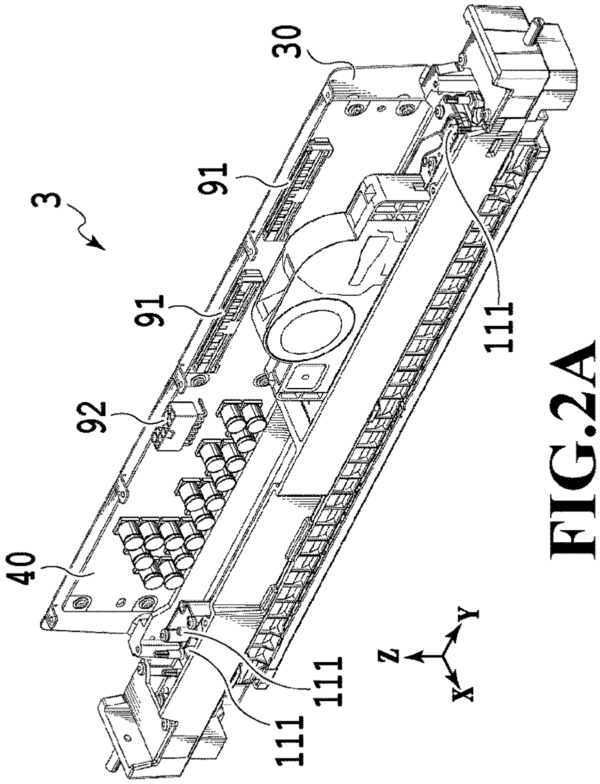
FIG. 2A is a schematic perspective view of a liquid ejection head viewed from a negative pressure control unit side.
Figure 2B:
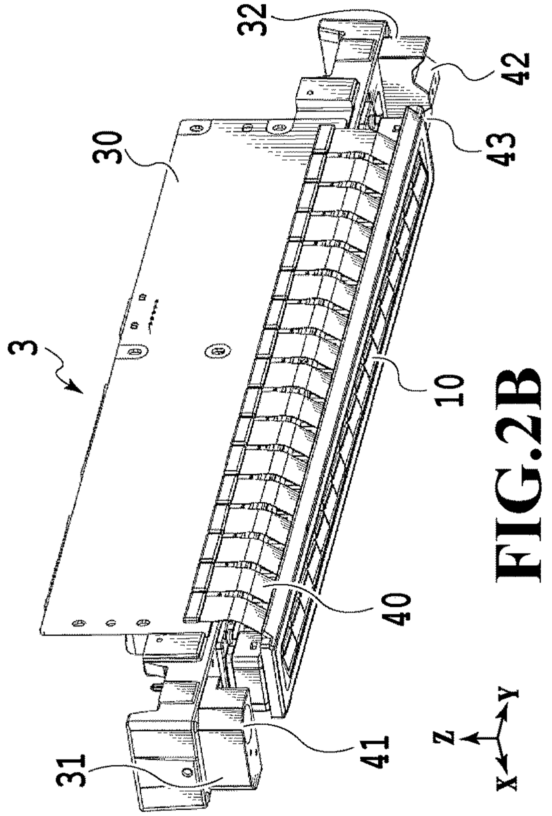
FIG. 2B is a schematic perspective view viewed from a recording element substrate side.

FIG. 2A to FIG. 2C are perspective views of the liquid ejection head 3 according to the present embodiment. The liquid ejection head 3 is a line type liquid ejection head in which an array of multiple recording element substrates 10, each of which is capable of ejecting ink, is installed in a straight line (arranged so as to be in-line). As illustrated in FIG. 2A and FIG. 2B, the liquid ejection head 3 is equipped with each recording element substrate 10 as well as the signal input terminal 91 and the power supply terminal 92 that are electrically connected via the flexible wiring substrate 40 and the electrical wiring substrate 90. The flexible wiring substrate 40 and the electrical wiring substrate 90 are electrically connected on the outer side of the electrical wiring substrate 90 in the head. The signal input terminal 91 and the power supply terminal 92 are electrically connected to the control part of the recording apparatus 1000, so as to supply ejection drive signals and the power required for ejection, respectively, to the recording element substrates 10.

By consolidating the wiring with the electric circuit in the electrical wiring substrate 90, the number of signal input terminals 91 and power supply terminals 92 can be made to be less than the number of recording element substrates 10. Accordingly, it is possible to reduce the number of electrically connecting parts that need to be removed at the time of assembling the liquid ejection head 3 to the recording apparatus 1000 or at the time of replacing the liquid ejection head 3. A cover member 130 which covers the recording element substrates 10 and the flexible wiring substrate 40 is installed on the periphery of the recording element substrates 10. Further, the electrical wiring substrate 90 is configured to be protected from the outside by the protective member 30. This protective member 30 also serves as an electrical shield, and is preferably a member made of metal. As illustrated in FIG. 2B, the liquid connection part 111 installed on one side of the liquid ejection head 3 is connected to the liquid supply system of the recording apparatus 1000. Accordingly, ink is supplied from the supply system of the recording apparatus 1000 to the liquid ejection head 3, and the ink that has passed through the liquid ejection head 3 is collected into the supply system of the recording apparatus 1000. In this way, the ink can circulate via the paths of the recording apparatus 1000 and the paths of the liquid ejection head 3.

<Configuration of the Liquid Ejection Head>

In FIG. 2C, an exploded perspective view of each component or unit that constitutes the liquid ejection head 3 is illustrated. The liquid ejection unit 300, the liquid supply unit 220, and the electrical wiring substrate 90 are attached to the casing 80. The liquid connection part 111 is installed in the liquid supply unit 220, and a filter (not illustrated in the drawings) that communicates with each opening of the liquid connection part 111 is installed inside of the liquid supply unit 220 in order to remove foreign substances in the supplied ink. The liquid that has passed through the filter 221 is supplied to the negative pressure control unit 230 which is arranged on the liquid supply unit 220. The negative pressure control unit 230 is a unit configured with pressure adjustment valves, and, by the operation of valves, spring members, etc., installed inside each, pressure drop changes inside the supply system of the apparatus 1000 (the supply system on the upstream side of the liquid ejection head 3) occurring with fluctuations of the flow rate of the liquid are significantly attenuated. In this way, it is possible to stabilize negative pressure changes on the downstream side (the liquid ejection unit 300 side) of the negative pressure control unit 230 within a certain range. Inside the negative pressure control unit 230, there are two pressure adjustment valves built-in, each of which is set to a different control pressure, and, via the liquid supply unit 220, the high pressure side communicates with the common supply flow path 211 inside the liquid ejection unit 300, and the low pressure side communicates with the common collecting flow path 212.

The casing 80 is configured with the liquid ejection unit support part 81 and the electrical wiring substrate support part 82, so as to support the liquid ejection unit 300 and the electrical wiring substrate 90 and ensure the rigidity of the liquid ejection head 3. The electrical wiring substrate support part 82 is for supporting the electrical wiring substrate 90, and is fixed to the liquid ejection unit support part 81 with screws. The liquid ejection unit support part 81 is equipped with the openings 83 and 84 into which the joint rubber 100 is inserted. The liquid supplied from the liquid supply unit 220 is guided, via the joint rubber 100, to the second flow path member 60, which constitutes the liquid ejection unit 300.

Next, an explanation is given of the configuration of the flow path member 210 included in the liquid ejection unit 300. As illustrated in FIG. 2C, in the flow path member 210, the first flow path member 50 and the second flow path member 60 are stacked. The multiple ejection modules 200 are bonded to the bonding surface of the first flow path member 50 with an adhesive (not illustrated in the drawings). The flow path member 210 is a flow path member for distributing the liquid supplied from the liquid supply unit 220 to each ejection module 200 and returning the liquid flowing out from the ejection modules 200 to the liquid supply unit 220. Further, the flow path member 210 is fixed to the liquid ejection unit support part 81 with screws, thereby suppressing warping and deformation of the flow path member 210.

Figure 3A:
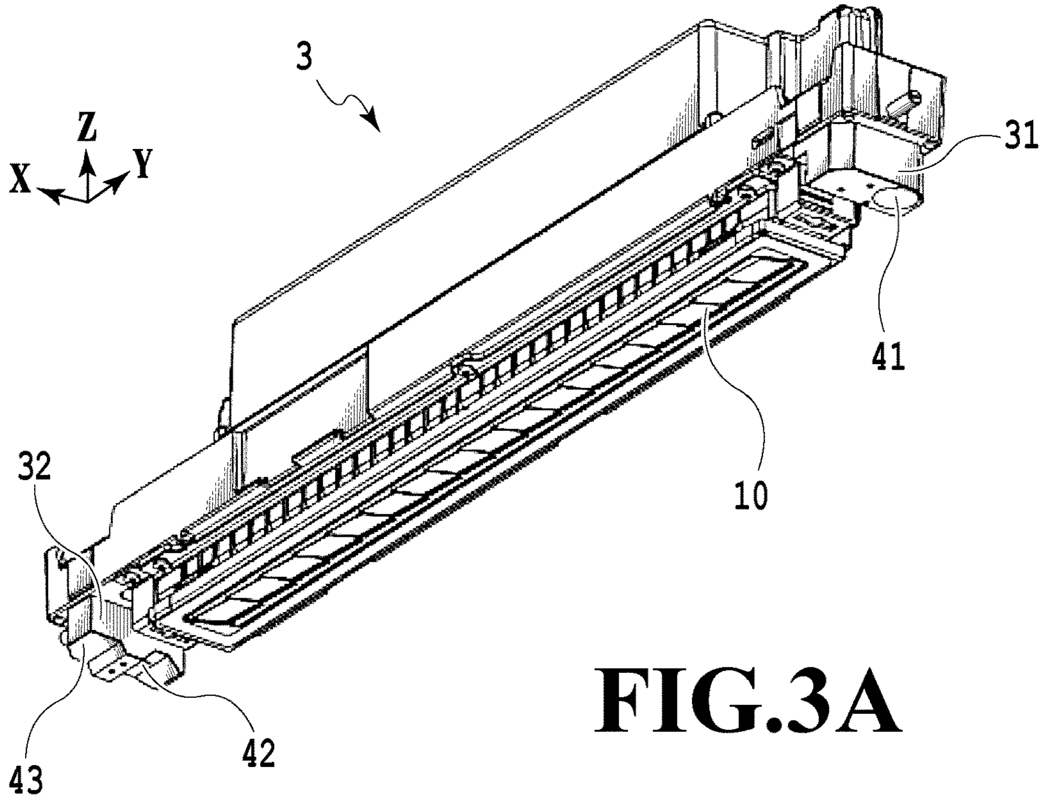
FIG. 3A is a bottom face perspective view of the liquid ejection head.
Figure 3B:
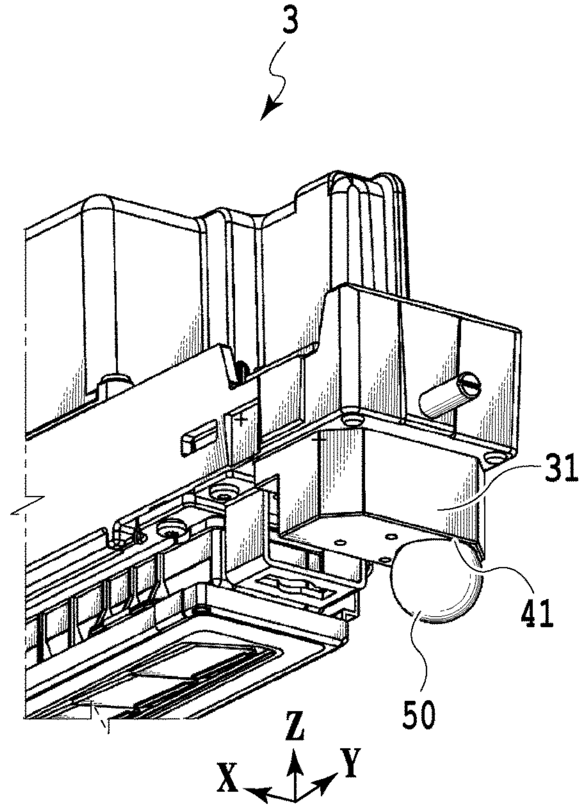
FIG. 3B is an enlarged view of a first positioning part of the liquid ejection head.
Figure 3C:
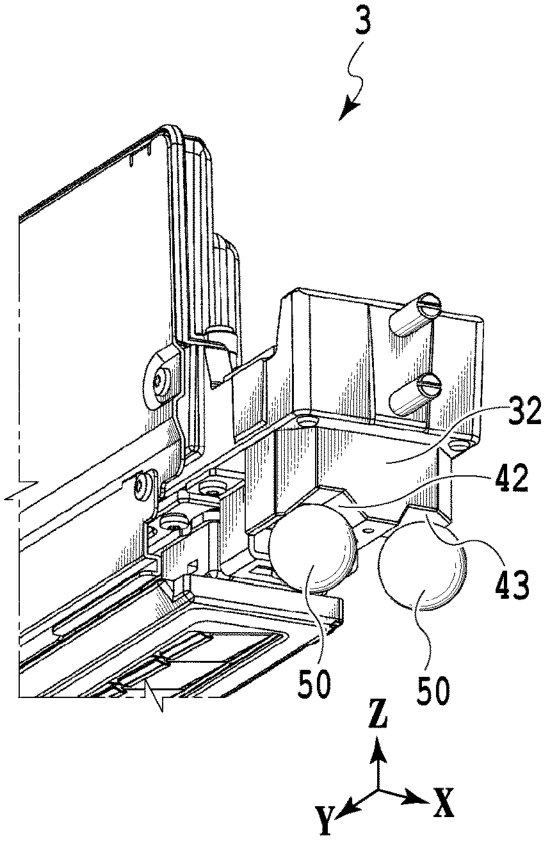
FIG. 3C is an enlarged view of a second positioning part of the liquid ejection head.

FIG. 3A is a perspective view of the liquid ejection head 3, and partial enlarged views thereof are illustrated in FIG. 3B and FIG. 3C.

The first positioning member 31 of the liquid ejection head 3 has the recess portion 41 (FIG. 3B) which has a conical shape opening in the liquid ejection direction (the downward direction of the Z-axis). The recess portion 41 forms the first positioning part which holds a convex portion (a part of the sphere 50) installed in the recording apparatus 1000. The conical shape may be a truncated conical shape. The sphere 50 is centered and made to abut at the center of the above-mentioned conically shaped recess portion, so as to fix translational degrees of freedom in three directions (the X, Y, and Z directions in the drawings).

The second positioning member 32 of the liquid ejection head 3 has the groove portion 42, which has a V-shape opening in the liquid ejection direction, and the flat plane 43, which is substantially parallel to the recording element substrates 10 (FIG. 3C). The groove portion 42 is on a straight line extending toward the first positioning member 31 and forms the second positioning part which holds a part of the other sphere 50 installed in the recording apparatus 1000. By the sphere 50 abutting on the V-shaped groove portion 42, the rotational degree of freedom with the axis corresponding to the normal line of the plane constituting the recording element substrates 10 (the rotation about the Z-axis) and the rotational degree of freedom with the axis corresponding to the normal line of the length direction of the head (the rotation about the X-axis) are fixed. Furthermore, the flat plane 43 of the second positioning member abuts on another different sphere 50 to form the third positioning part. The abutting of the sphere 50 on the flat plane 43 fixes the rotational degree of freedom with the axis in the length direction of the head (the rotation about the Y-axis).

Since the groove portion 42 (the V-shaped groove portion) of the second positioning member 32 is formed on a straight line extending from the first positioning member towards the longitudinal direction of the liquid ejection head, elongation of the liquid ejection head 3 during thermal expansion can be corrected by sliding the surface of the sphere in the V-shaped groove portion. Further, it is preferable that the recess portion 41 is formed on the straight line extending from the groove portion 42. In this case, since the liquid ejection head 3 is fixed by the recess portion 41, the influence of thermal expansion can be efficiently released to the groove portion 42. Further, by the arrangement on a straight line, regulation for positioning at the time of attaching the positioning members is easy, and high accuracy attachment becomes possible.

The radius of the conically shaped recess portion 41 and the width of the V-shaped groove portion 42 may be any size that can abut on and fix the sphere 50. If the size is too small, the liquid ejection head 3 cannot be held, which causes blurring and tilting. On the other hand, if the size is too large, in the case of the conically shaped recess portion 41, proper centering of the sphere 50 is not possible. Further, if the width of the groove portion 42 is too large, the sphere 50 cannot be supported by both sides of the groove portion 42, which results in blurring and tilting.

The spheres 50 installed in the recording apparatus 1000 may have different sizes or may have the same size. The same size is preferable because the efficiency of procuring parts and manufacturing recording apparatuses improves. The first positioning member 31, the second positioning member 32, and the spheres 50 can be made of metal, ceramic, resin, etc. Metal or ceramic are preferable, as resistance to abrasion and deformation is high, and high accuracy can be maintained even in the case of repeated attaching/detaching.

Figure 4A:
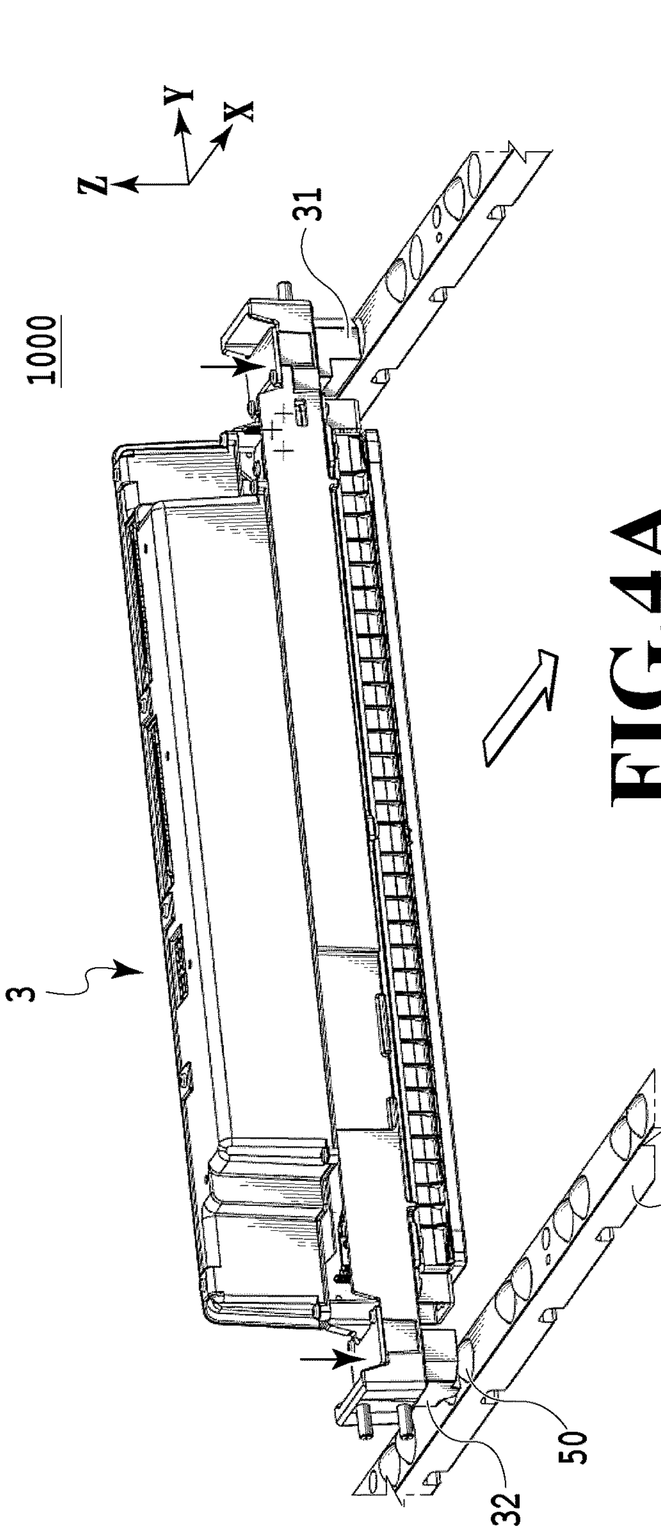
FIG. 4A is a perspective view of the liquid ejection head installed in the liquid ejection apparatus.
Figure 4B:
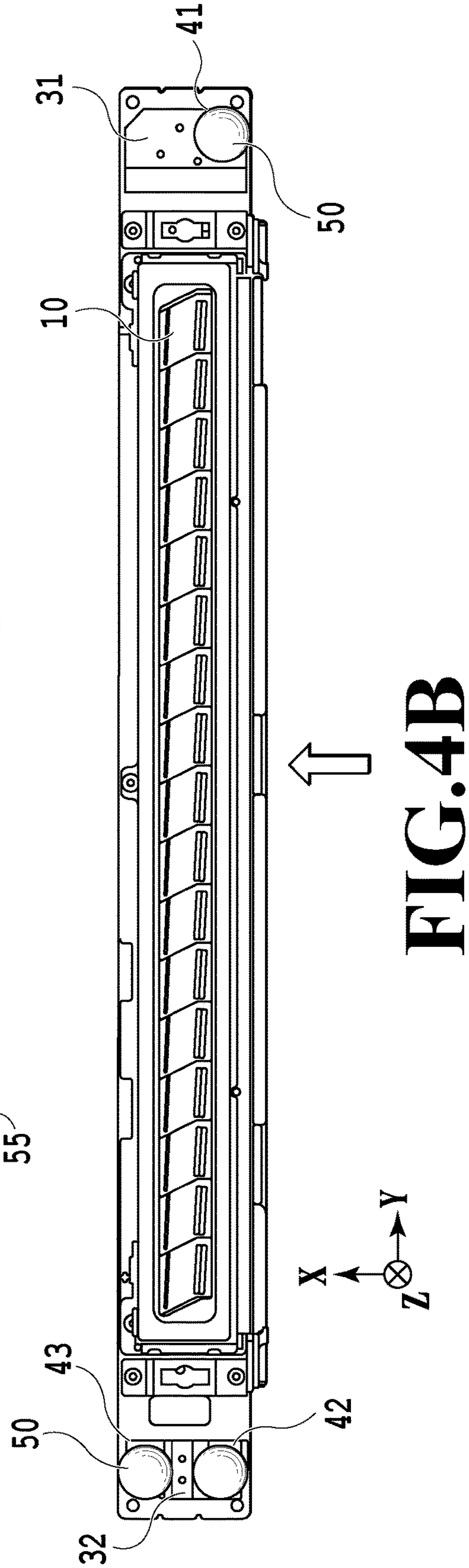
FIG. 4B is a bottom face view of the liquid ejection head in FIG. 4A.

In FIG. 4A, a perspective view of the liquid ejection head 3 installed in the recording apparatus 1000 is illustrated. The liquid ejection head 3 is installed over the spheres 50 installed in the recording apparatus 1000. The frame 55 on which the spheres 50 are configured for positioning the liquid ejection head 3 is installed in the recording apparatus 1000. The liquid ejection head 3 is configured to be detachably attachable to the recording apparatus 1000. The first positioning member 31 and the second positioning member 32 configured in the liquid ejection head 3 are respectively positioned and held with the spheres 50 configured in the recording apparatus 1000. In the present embodiment, the recording element substrates 10 for ejecting ink are installed between the first positioning member 31 and the second positioning member 32 (FIG. 4B). Therefore, the recording medium 2 is conveyed under the recording element substrates 10 in the direction of the arrow in FIG. 4A (the X-axis direction) to perform recording.

In the present embodiment, the multiple recording element substrates 10 are arranged in a straight line in the longitudinal direction (the Y-axis direction) in the liquid ejection head 3. The first positioning member 31 is configured at one end in the longitudinal direction of the liquid ejection head, and the second positioning member 32 is configured at the other end on the opposite side of the one end in the longitudinal direction. Accordingly, as illustrated in FIG. 4A, the spheres 50 may be configured in the portions that make contact with each end portion of the liquid ejection head 3 with respect to the printing apparatus side, and thus a configuration for conveying the recording medium 2 to the recording element substrates 10 in the central portion is made easy. Of course, it is also possible to arrange the first positioning member 31 and the second positioning member 32 in the central portion of the liquid ejection head 3 instead of each end portion thereof, but the configuration of the arrangement of the spheres 50 becomes complicated and the size of the recording apparatus may increase.

Further, regarding the abutting of the first positioning member 31 and the second positioning member 32 on the spheres 50, the abutting and holding is performed by even just the own weight of the liquid ejection head 3. However, as illustrated in FIG. 4A, by pressing from above the first positioning member 31 and the second positioning member 32, the holding with the spheres 50 can be reliably performed. Depending on the configuration of the recording apparatus 1000, it is also possible to hold the liquid ejection head 3 tilted with respect to the direction of gravity by pressing as described above. In this way, holding and fixing of the liquid ejection head 3 can be easily performed, and, by having the first positioning member 31, the second positioning member 32, and the spheres 50 made of metal or ceramic, resistance to abrasion and deformation becomes high, and highly accurate positioning can be achieved even in the case of repeated attaching/detaching each printing operation.

The liquid ejection head 3 requires highly accurate arrangement of the recording element substrates 10 in order to perform high quality printing. Furthermore, in order to maintain high quality printing as the liquid ejection head 3 is attached to the recording apparatus 1000, positional accuracy of the two positioning members 31 and 32 with respect to the recording element substrates 10 is required.

As for the order in which the positioning members 31 and 32 are attached to the casing 80 during manufacturing, there is a method of attaching the positioning members 31 and 32 before or after installation of the recording element substrates 10. In the case of the method of attaching the positioning members 31 and 32 before installing the recording element substrates 10, it is necessary to arrange the recording element substrates 10 at a highly accurate position with respect to the attached positioning members 31 and 32. In this case, since the positional accuracy of the recording element substrates 10 with respect to the liquid ejection head 3 is deteriorated, there is a concern of trouble due to relative misalignment with respect to the flexible wiring substrate and the electrical wiring substrate.

In the case of the method of attaching the positioning members 31 and 32 after the recording element substrates 10 are installed, by arranging the recording element substrates 10 at a desired position with high accuracy with respect to the liquid ejection head 3, the recording element substrates 10 can be arranged with high accuracy with respect to the flexible wiring substrate and the electrical wiring substrate as well. After that, the two positioning members 31 and 32 can be attached to the casing 80 at highly accurate positions with respect to the recording element substrates 10. At this time, since the positioning members 31 and 32 can be attached by a relatively simple method such as fixing with screws or fixing with an adhesive, there is no influence on the accuracy, and attachment with high accuracy is possible.

According to the configuration of the present disclosure, the places which constitute the recess portion 41 and the groove portion 42 are provided in the liquid ejection head 3, so as to perform positioning with the spheres 50 of the recording apparatus 1000. Conversely, it is also possible to configure the spheres 50 in the liquid ejection head 3, and provide the recording apparatus 1000 side with the recess portion 41 and the groove portion 42 as in the positioning members 31 and 32. Although there is a method such as press fitting as a method for attaching the spheres, as described above, to attach the recording element substrates 10 with high accuracy, the attachment is easier with the configuration of the present disclosure.

Figure 5A:
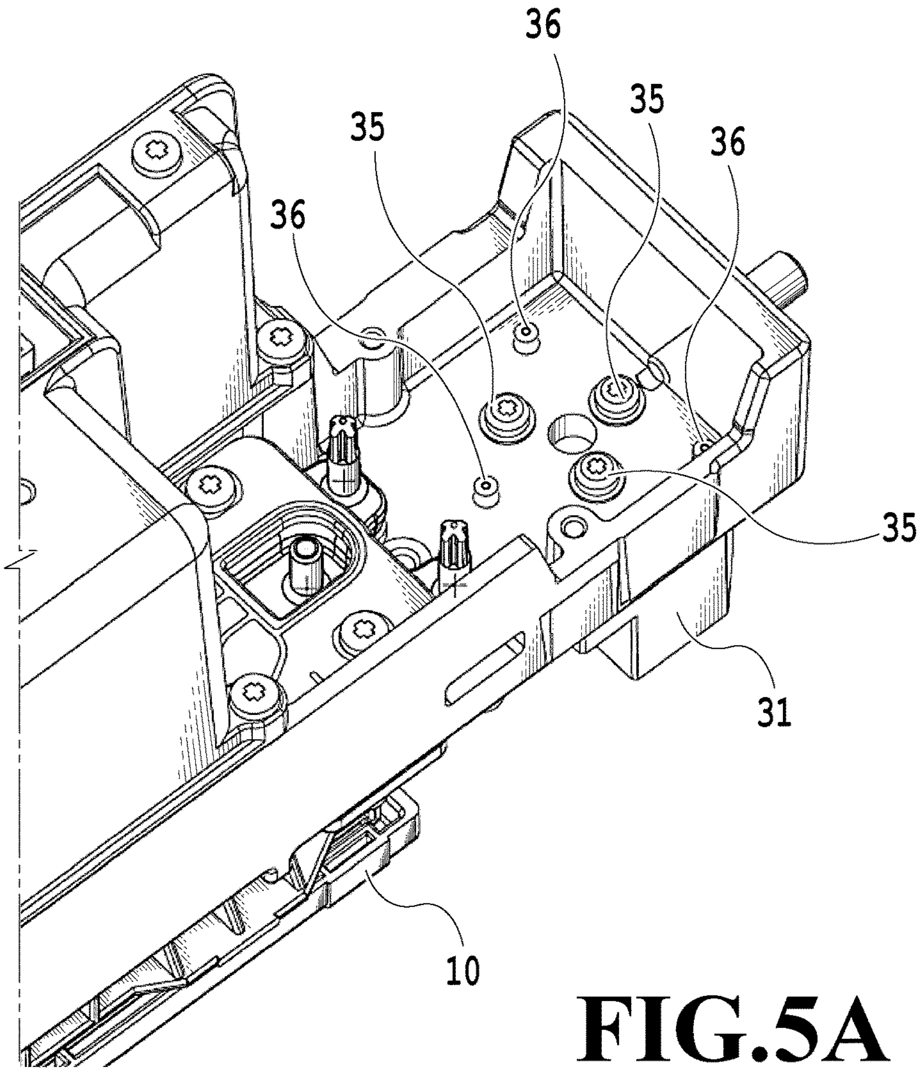
FIG. 5A is a diagram illustrating the attached state of the first positioning member.
Figure 5B:
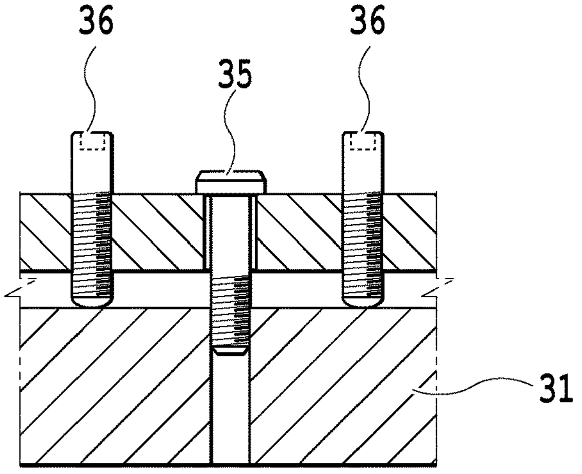
FIG. 5B is a diagram illustrating the attached state of the first positioning member.

In FIG. 5A and FIG. 5B, the state of the first positioning member 31 being attached is illustrated. The first positioning member 31 is fixed in an arrangement state with high accuracy in relation to the recording element substrates 10. In a case of using fixing screws as the fixing method, as in the present embodiment, it is necessary to regulate the Z direction. For example, the first positioning member 31 can be arranged with regard to the X and Y directions by screw fixing in a regulated state, and, by regulating with the adjusting screws 36 for regulation of the Z direction, high accuracy attachment using screw fixing is possible. As a result, the liquid ejection surface of the liquid ejection head 3 and the conveyance surface can be adjusted so as to be parallel. Similarly, the second positioning member 32 can also be arranged in relation to the recording element substrates 10 with high accuracy using the fixing screws 35 and the adjusting screws 36.

Second Embodiment

In the following, mainly points that are different from the above-described first embodiment are explained, and explanations of parts similar to the above-described configuration are omitted.

<Overall Configuration of the Apparatus>

Figure 6:
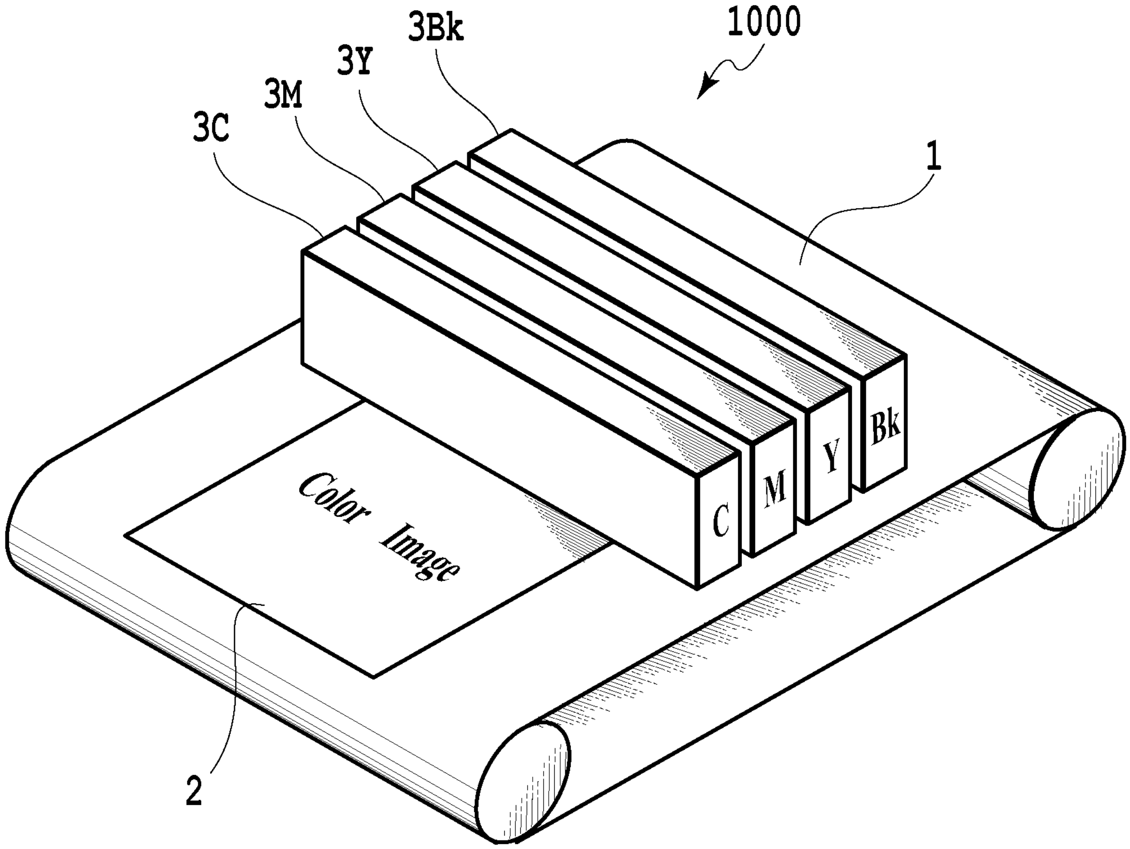
FIG. 6 is a diagram illustrating an example of a liquid ejection apparatus.

FIG. 6 is a diagram illustrating an example of the liquid ejection apparatus in the present embodiment. The liquid ejection apparatus of the present embodiment is the liquid ejection apparatus 1000 (hereinafter also simply referred to as the apparatus 1000) as an inkjet printer that records a color image on the recording medium 2 by ejecting yellow (Y), magenta (M), cyan (C), and black (Bk) inks.

In FIG. 6, a form of the apparatus 1000 in which the liquid ejection head 3 directly applies ink to the recording medium 2 being conveyed is illustrated. The recording medium 2 is mounted on the conveyance part 1 and is conveyed at a predetermined speed below the four liquid ejection heads 3 (3Y, 3M, 3C, 3Bk) that eject different inks. In FIG. 6, the four liquid ejection heads 3 are arranged in the order of 3Bk, 3Y, 3M, and 3C in the conveyance direction of the recording medium 2, and ink is applied to the recording medium 2 in the order of black, yellow, magenta, and cyan. In each liquid ejection head 3, multiple ejection ports for ejecting ink are arranged in the Y direction.

Note that, although cut paper is illustrated as the recording medium 2 in FIG. 6, the recording medium 2 may be continuous paper supplied from roll paper. Further, the recording medium is not limited to paper, and may be, for example, a film or the like.

Further, unlike the first embodiment, the present embodiment is a liquid ejection apparatus with a configuration where one liquid ejection head ejects monochromatic ink.

<Liquid Circulation Path>

Figure 7:
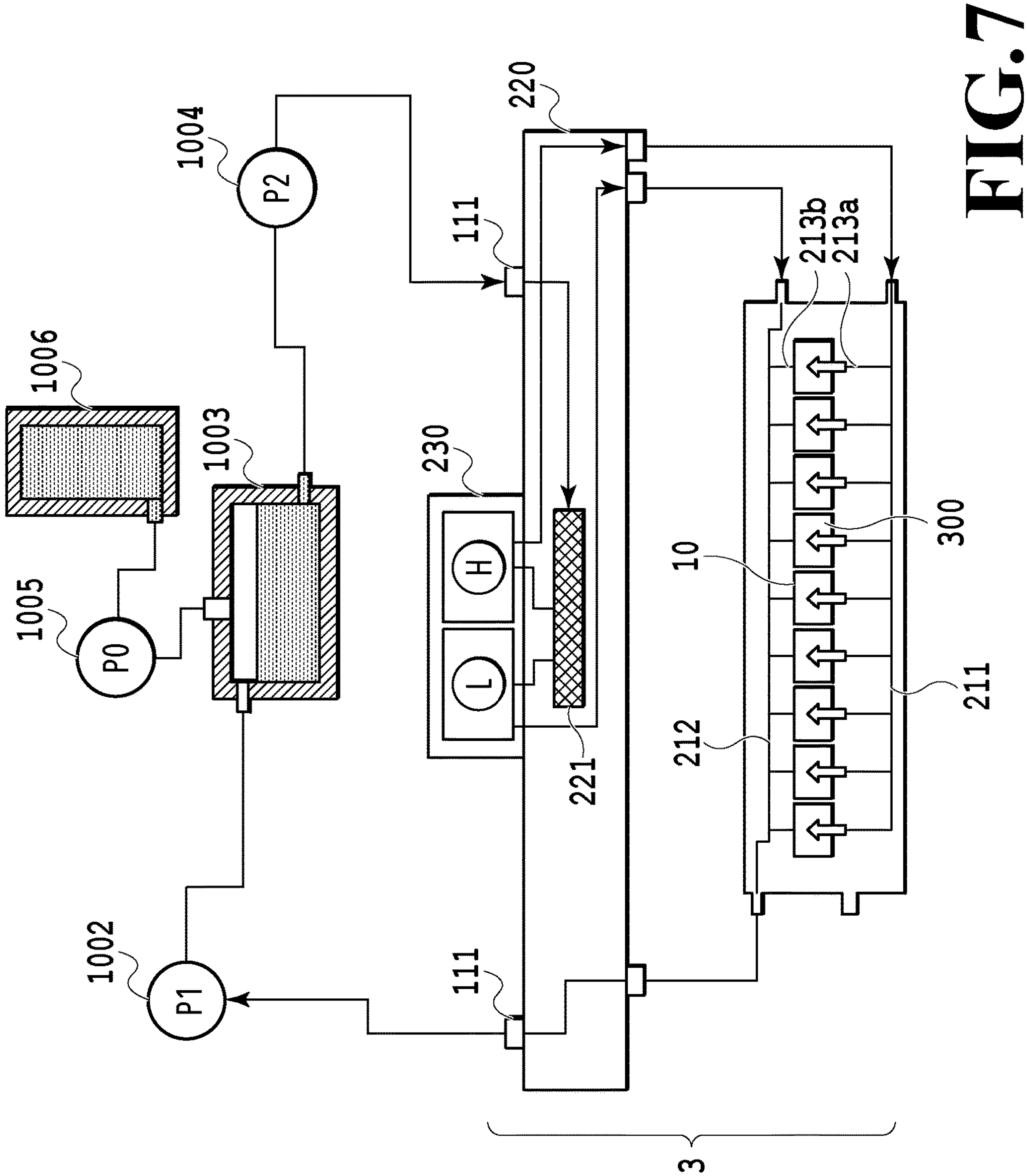
FIG. 7 is a schematic view illustrating an example of the circulation path applied to the liquid ejection apparatus of the present disclosure.

FIG. 7 is a schematic diagram illustrating the liquid circulation path in the recording apparatus of the present embodiment, and is a diagram in which the liquid ejection head 3 is fluidly connected to the first circulating pump 1002, the buffer tank 1003, etc. Note that, although only the path through which the ink of the liquid ejection head corresponding to one color of ink flows is illustrated in FIG. 7, the main body of the apparatus 1000 is equipped with circulation paths corresponding to the types of ink to be ejected.

The buffer tank 1003, which is a sub tank connected to the main tank 1006, has an air communication port (not illustrated in the drawings) that makes the inside and the outside of the tank communicate with each other, and it is possible to discharge air bubbles in the ink to the outside. The buffer tank 1003 is also connected to the replenishing pump 1005. If the liquid is consumed by the liquid ejection head 3 for ejecting (discharging) ink from the ejection ports of the liquid ejection head, such as recording and suction recovery performed by ejecting ink, the replenishing pump 1005 transfers the consumed amount of ink from the main tank 1006 to the buffer tank 1003.

The first circulating pump 1002 has a role of drawing liquid from the liquid connection part 111 of the liquid ejection head 3 and flowing the liquid to the buffer tank 1003. At the time the liquid ejection head 3 is driven, a fixed amount of ink is flowed into the common collecting flow path 212 by the first circulating pump 1002.

The negative pressure control unit 230 is installed between the paths of the second circulating pump 1004 and the liquid ejection unit 300. There is a function of operating so that, even in a case where the flow rate of the circulation system fluctuates due to a difference in duty for performing recording, the pressure of the downstream side of the negative pressure control unit 230 (on the liquid ejection unit 300 side) is maintained at a fixed pressure set in advance.

As illustrated in FIG. 7, the negative pressure control unit 230 is equipped with two pressure adjustment mechanisms, each of which is set to a mutually different control pressure. Of the two pressure adjustment mechanisms, each of the relatively high pressure setting side (indicated by H in FIG. 7) and the relatively low pressure side (indicated by L in FIG. 7) passes through the liquid supply unit 220 and is connected to the common supply flow path 211 or the common collecting flow path 212 in the liquid ejection unit 300. The common supply flow path 211, the common collecting flow path 212, and the individual supply flow paths 213*a* and the individual collecting flow paths 213*b* that communicate with each recording element substrate are installed in the liquid ejection unit 300. Since the individual flow paths 213*a*, 213*b* communicate with the common supply flow path 211 and the common collecting flow path 212, some of the liquid flowed by the second circulating pump 1004 passes from the common supply flow path 211 through the internal flow path of the recording element substrates 10 to the common collecting flow path 212 (the arrows in FIG. 7). This is because a pressure difference is set between the pressure adjustment mechanism H connected to the common supply flow path 211 and the pressure adjustment mechanism L connected to the common collecting flow path 212, and the first circulating pump 1002 is only connected to the common collecting flow path 212.

In this manner, a liquid flow that passes through the common collecting flow path 212 and a liquid flow that passes from the common supply flow path 211 through each recording element substrate 10 towards the common collecting flow path 212 occur in the liquid ejection unit 300. Therefore, the heat generated in each recording element substrate 10 can be discharged to the outside of the recording element substrates 10 via the flow from the common supply flow path 211 to the common collecting flow path 212.

Further, with a configuration as such, as recording is being performed by the liquid ejection head 3, it is possible to cause a flow of ink even in an ejection port or a pressure chamber in which recording is not being performed, and thus, thickening of the ink at those sections can be suppressed. Moreover, thickened ink and foreign substances in the ink can be discharged to the common collecting flow path 212. Therefore, high-speed and high-quality recording is possible with the liquid ejection head 3 of the present embodiment.

The liquid ejection head of the present invention is not limited to the liquid ejection head with the liquid circulation path described above. The liquid ejection head of the present invention may have the liquid circulation path described in the first embodiment, may have other liquid circulation paths and mechanisms, or may not have a liquid circulation configuration. Any given liquid path configuration is applicable.

<Positioning Member>

The casing 80 ensures the rigidity of the liquid ejection head 3 as described above, and also functions as a support member for the flow path member 210. Therefore, the casing 80 needs to be wider than the liquid ejection area in which the ejection ports are arranged in the liquid ejection head 3, and is a member that extends substantially over the entire length of the head. Further, the area where the ejection modules 200 are mounted is positioned facing the recording medium 2. Considering the above, in order to secure the mounting position of the positioning members 31 and 32 facing the spheres 50 on the apparatus main body side, it is preferable to arrange the positioning members 31 and 32 at the end portions of the casing 80, which is a member extending beyond the liquid ejection area of the liquid ejection head 3.

Further, in order to maintain the positions between the ejection modules 200 mounted to the flow path member 210 with high accuracy, before mounting the ejection modules 200 on the flow path member 210, it is preferable to fix the flow path member 210 to the casing 80 in advance. As described above, after the ejection modules 200 are mounted to the flow path member 210, the positioning members 31 and 32 are attached to the casing 80 while adjusting the position with respect to the nozzle positions of the ejection modules 200, and thereby it is possible to absorb misalignment with respect to the casing 80 at the time the ejection modules 200 are mounted.

Figure 8:
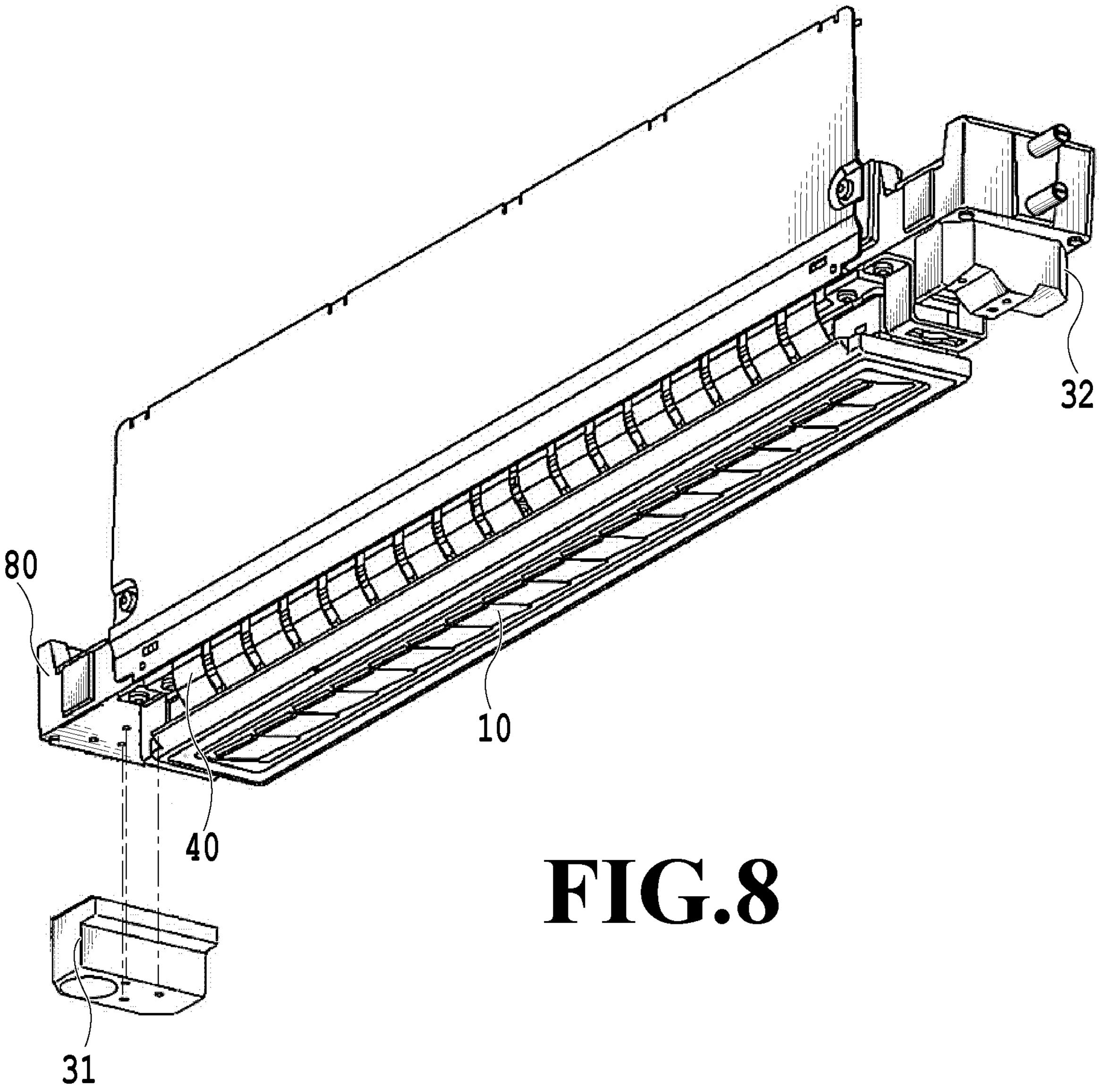
FIG. 8 is a diagram illustrating a situation where the first positioning member is attached to a casing after ejection modules are mounted.
Figure 10A:
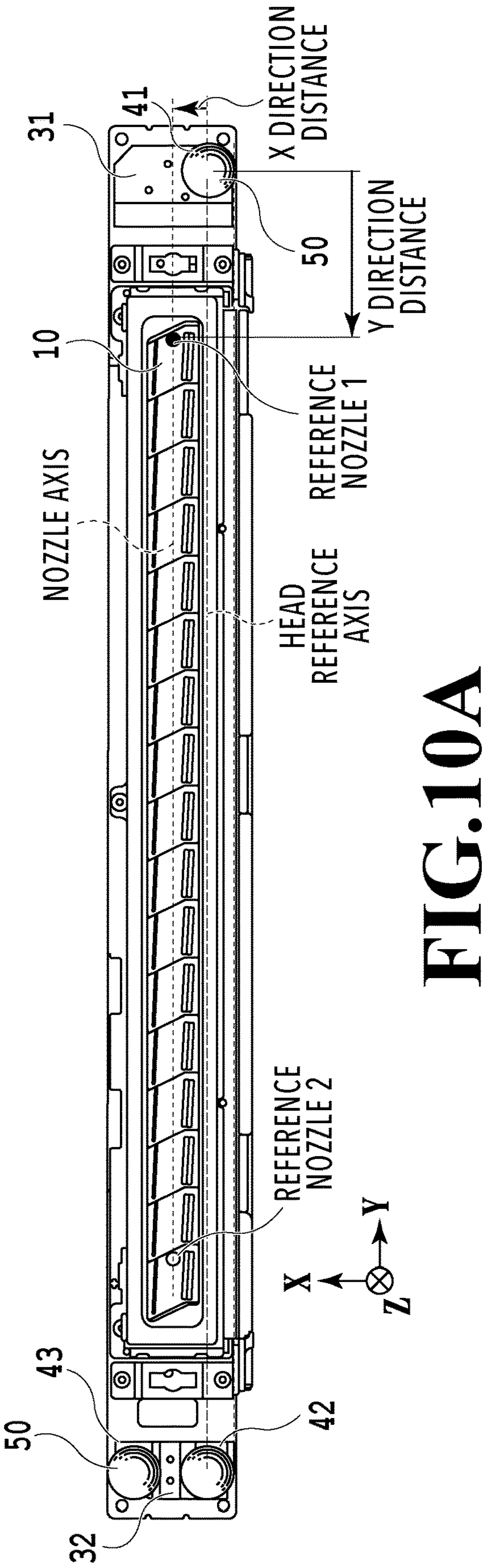
FIG. 10A is a diagram illustrating a head reference axis and a nozzle axis in the liquid ejection head.
Figure 10B:
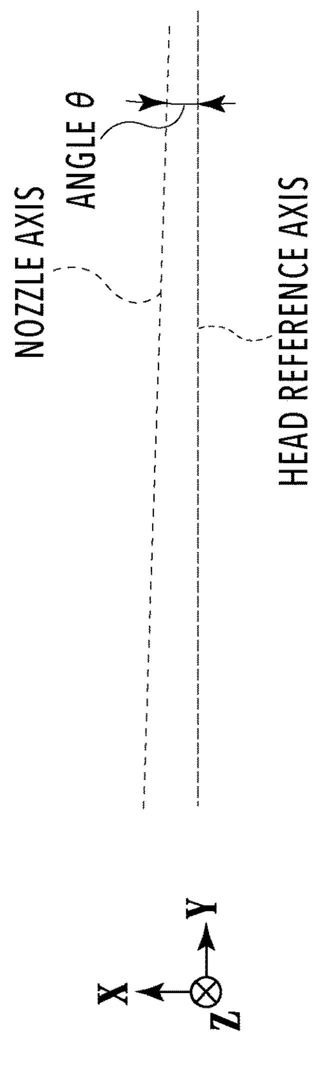
FIG. 10B is a diagram illustrating the head reference axis and the nozzle axis in the liquid ejection head.

In FIG. 8, an example in which a portion corresponding to the positioning member 32 is formed in the casing 80 in advance is illustrated, and the positioning member 31 is fixed to the casing 80 after the ejection modules 200 are mounted. In this case, since the positioning member 31 can be mounted while observing the positions of the surfaces on which the ejection ports are formed (the ejection port surfaces) of the recording element substrates 10, as illustrated in FIG. 10A and FIG. 10B, it is possible to adjust the Y direction distance, the X direction distance, and the Z direction distance of the two reference nozzles positioned at both ends of the array of the multiple recording element substrates, and the angle θ between the nozzle axis, which is comprised of a line connecting the two reference nozzles, and the head reference axis, which is comprised of a line connecting the reference 50 and the groove portion 42. Note that, as long as the two reference nozzles are each included in different ejection modules 200, selection may be done in any manner. In FIG. 10A and FIG. 10B, as an example, in each of the two ejection modules 200 positioned at both ends of the ejection module row, nozzles positioned at the same location are used as the two reference nozzles. In the direction of liquid ejection, it is preferable that the difference in height of the ejection port surfaces is within 200 μm among the multiple recording element substrates.

Note that in a case where one positioning member is attached to the casing 80 after mounting the ejection modules, there may be a method where a positioning part corresponding to the first positioning member 31 is formed in the casing 80 in advance, and the second positioning member 32 is fixed later.

Figure 9:
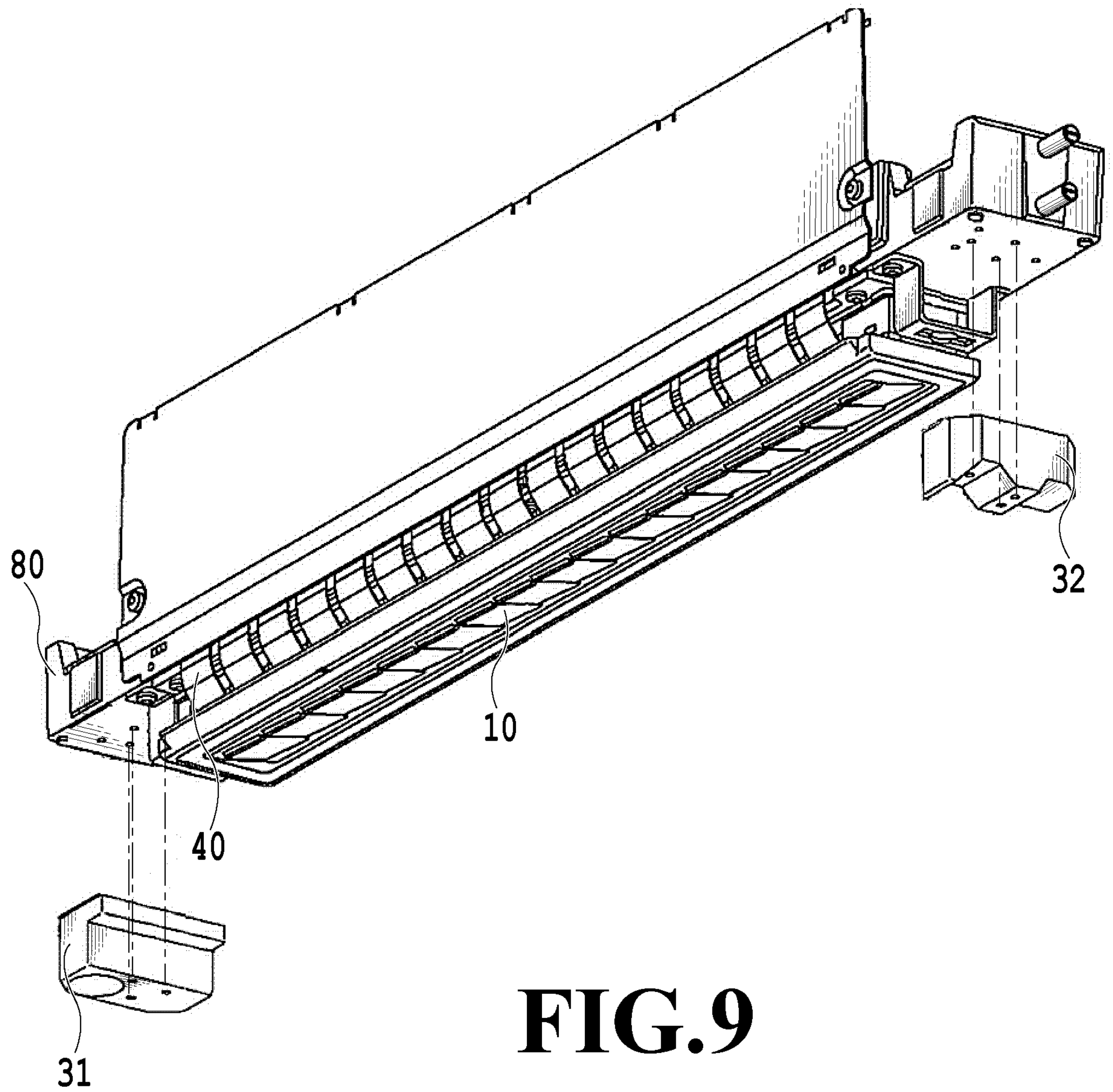
FIG. 9 is a diagram illustrating a situation where the first positioning member and the second positioning member are attached to the casing after the ejection modules are mounted.

Further, in FIG. 9, an example in which the positioning members 31 and 32 are fixed to the casing 80 after the ejection modules 200 are mounted is illustrated. In this case, as illustrated in FIG. 8, the above-described Y direction distance, X direction distance, Z direction distance, and angle θ can be adjusted. Further, the positioning members 31 and 32 can be attached while adjusting the Z-direction attachment height and the angle with respect to the ejection ports.

Considering only the accuracy after assembling the liquid ejection apparatus, the method of fixing both the positioning members 31 and 32 to the casing 80 after the ejection modules 200 are mounted (see FIG. 9) is preferable because there are more axes for adjustable misalignment than the method of only fixing the positioning member 31 to the casing 80 (see FIG. 8). However, since the processing steps increase to fix the two positioning members while performing an adjustment and the number of parts increases, the number of positioning members and the fixing order may be selected depending on the positional accuracy of the recording element substrates required in the liquid ejection apparatus.

As described above, in the present embodiment, the positioning members and the nozzle positions (the ejection port positions) of the ejection modules are maintained with high precision in any head. Therefore, it is possible to prevent color shift and the like in a case where multiple liquid ejection heads, e.g., heads ejecting different ink colors, are mounted on the main body of the printing apparatus. Further, even in a case where an adjustment is performed by electrical processing such as image processing or shifting the ejection ports to be used after mounting the liquid ejection head, the adjustment can be easily performed.

OTHER EMBODIMENTS

The present disclosure includes configurations typified by the following examples of a recording apparatus and examples of a method of controlling a recording apparatus.

<Configuration 1>

A liquid ejection head including a recording element substrate configured with a liquid ejection port, the liquid ejection head includes: a first positioning member configured with a first positioning part including a recess portion opening in a direction of liquid ejection; and a second positioning member configured with a second positioning part, which includes a groove portion opening in the direction of liquid ejection and extending towards the first positioning member, and a third positioning part, which includes a flat plane portion substantially parallel to the recording element substrate.

<Configuration 2>

The liquid ejection head according to Configuration 1, wherein the first positioning member is arranged on one end in a longitudinal direction of the liquid ejection head, and wherein the second positioning member is arranged on the other end on the opposite side of the one end in the longitudinal direction.

<Configuration 3>

The liquid ejection head according to Configuration 1 or 2, wherein the recess portion is conically shaped.

<Configuration 4>

The liquid ejection head according to any one of Configurations 1 to 3, wherein the groove portion extends in a longitudinal direction of the liquid ejection head.

<Configuration 5>

The liquid ejection head according to any one of Configurations 1 to 4, wherein a surface forming the groove portion of the second positioning part tilts so as to widen towards the opening.

<Configuration 6>

The liquid ejection head according to any one of Configurations 1 to 5, wherein a plurality of the recording element substrates is arranged in a longitudinal direction of the liquid ejection head.

<Configuration 7>

The liquid ejection head according to Configuration 6, wherein the first positioning member and the second positioning member are arranged at positions sandwiching the plurality of the recording element substrates in the longitudinal direction of the liquid ejection head.

<Configuration 8>

The liquid ejection head according to any one of Configurations 1 to 7, wherein the liquid ejection head includes an adjustment unit configured to adjust distances of the first positioning member and the second positioning member in the direction of liquid ejection.

<Configuration 9>

A liquid ejection head which is detachably attachable to a liquid ejection apparatus, the liquid ejection head includes: a recording element substrate configured with a liquid ejection port; a first positioning member configured with a first positioning part including a recess portion opening in a direction of liquid ejection; and a second positioning member configured with a second positioning part, which includes a groove portion opening in the direction of liquid ejection and extending towards the first positioning member, and a third positioning part, which includes a flat plane portion substantially parallel to the recording element substrate, wherein the liquid ejection apparatus includes three convex portions configured to abut on the first positioning part, the second positioning part, and the third positioning part, respectively.

<Configuration 10>

The liquid ejection head according to Configuration 9, wherein the first positioning member and the second positioning member are arranged respectively on each end portion of the liquid ejection head in a longitudinal direction.

<Configuration 11>

The liquid ejection head according to Configuration 9 or 10, wherein the recess portion is conically shaped, and the convex portions are at least a part of spheres.

<Configuration 12>

The liquid ejection head according to any one of Configurations 9 to 11, wherein a surface forming the groove portion of the second positioning part tilts.

<Configuration 13>

A liquid ejection apparatus including a detachably attachable liquid ejection head, the liquid ejection head includes: a recording element substrate configured with a liquid ejection port; a first positioning member configured with a first positioning part including a recess portion opening in a direction of liquid ejection; and a second positioning member configured with a second positioning part, which includes a groove portion opening in the direction of liquid ejection and extending towards the first positioning member, and a third positioning part, which includes a flat plane portion substantially parallel to the recording element substrate, wherein the liquid ejection apparatus includes at least three convex portions configured to abut on the first positioning part, the second positioning part, and the third positioning part, respectively.

<Configuration 14>

The liquid ejection apparatus according to Configuration 13, wherein the first positioning member and the second positioning member are configured respectively on each end portion of the liquid ejection head in a longitudinal direction.

<Configuration 15>

The liquid ejection apparatus according to Configuration 13 or 14, wherein the recess portion is conically shaped, and the convex portions are at least a part of spheres.

<Configuration 16>

A liquid ejection head which is a full-line type equipped with a plurality of recording element substrates configured with liquid ejection ports, the liquid ejection head includes: a support member configured to extend in a longitudinal direction of the liquid ejection head to support the plurality of recording element substrates; and a positioning member equipped on the support member.

<Configuration 17>

The liquid ejection head according to Configuration 16, wherein a separate member is arranged between the support member and the recording element substrates.

<Configuration 18>

The liquid ejection head according to Configuration 17, wherein the separate member includes a flow path for supplying liquid to the recording element substrates.

<Configuration 19>

The liquid ejection head according any one of Configurations 16 to 18, wherein the positioning member includes a first positioning member, which is equipped at one end in the longitudinal direction of the liquid ejection head, and a second positioning member, which is equipped at the other end on the opposite side of the one end in the longitudinal direction, and wherein the first positioning member and the second positioning member are configured at positions sandwiching the plurality of recording element substrates in the longitudinal direction of the liquid ejection head.

<Configuration 20>

The liquid ejection head according to any one of Configurations 16 to 19, wherein, in a direction of liquid ejection, a difference in height of ejection port surfaces is within 200 μm among the plurality of recording element substrates.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-193612 filed Dec. 2, 2022, and No. 2023-160139 filed Sep. 25, 2023, which are hereby incorporated by reference herein in their entirety.

What is claimed is:

1. A liquid ejection head including a recording element substrate configured with ejection port surfaces each having a liquid ejection port, the liquid ejection head comprising:

a first positioning member configured with a first positioning part including a recess portion opening in a direction of liquid ejection; and a second positioning member configured with a second positioning part, which includes a groove portion opening in the direction of liquid ejection and extending towards the first positioning member, and a third positioning part, which has a flat plane substantially parallel to the ejection port surfaces, wherein the recess portion of the first positioning part is disposed on a straight line extending from the groove portion of the second positioning part, wherein the second positioning part has a first surface which is one of the sides of the groove portion located closer to the flat plane, wherein the third positioning part has a second surface connected to the flat plane, and wherein the first surface and the second surface are connected on the second positioning member and intersect on an extension line extended in a direction away from the flat plane.

2. The liquid ejection head according to claim 1, wherein the first positioning member is arranged on one end in a longitudinal direction of the liquid ejection head, and wherein the second positioning member is arranged on the other end on the opposite side of the one end in the longitudinal direction.

3. The liquid ejection head according to claim 1, wherein the recess portion is conically shaped.

4. The liquid ejection head according to claim 1, wherein the groove portion extends in a longitudinal direction of the liquid ejection head.

5. The liquid ejection head according to claim 1, wherein a surface forming the groove portion of the second positioning part tilts so as to widen towards the opening.

6. The liquid ejection head according to claim 1, wherein a plurality of the recording element substrates is arranged in a longitudinal direction of the liquid ejection head.

7. The liquid ejection head according to claim 6, wherein the first positioning member and the second positioning member are arranged at positions sandwiching the plurality of the recording element substrates in the longitudinal direction of the liquid ejection head.

8. The liquid ejection head according to claim 1, wherein the liquid ejection head includes an adjustment unit configured to adjust distances of the first positioning member and the second positioning member in the direction of liquid ejection.

9. The liquid ejection head according to claim 1, wherein the liquid ejection head is attachable to a main body of a recording apparatus having a support part, and wherein the third positioning part abuts against the support part on the flat plane.

* * * * *